US012641631B2

(12) United States Patent
Sha et al.

(10) Patent No.: US 12,641,631 B2
(45) Date of Patent: May 26, 2026

(54) METHOD, DEVICE, AND SYSTEM FOR PAGING RESOURCE SELECTION AND SYSTEM INFORMATION TRANSMISSION/ACQUISITION IN WIRELESS NETWORKS

(71) Applicant: ZTE Corporation, Shenzhen (CN)

(72) Inventors: Xiubin Sha, Shenzhen (CN); Bo Dai, Shenzhen (CN); Jianxun Al, Shenzhen (CN); Zijiang Ma, Shenzhen (CN); Yin Gao, Shenzhen (CN); Ting Lu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 369 days.

(21) Appl. No.: 18/078,225

(22) Filed: Dec. 9, 2022

(65) Prior Publication Data

US 2023/0247656 A1 Aug. 3, 2023

Related U.S. Application Data

(63) Continuation of application No. PCT/CN2020/121065, filed on Oct. 15, 2020.

(51) Int. Cl.
*H04W 72/53* (2023.01)
*H04W 68/02* (2009.01)
(Continued)

(52) U.S. Cl.
CPC ........... *H04W 72/53* (2023.01); *H04W 68/02* (2013.01); *H04W 76/28* (2018.02); *H04W 72/23* (2023.01)

(58) Field of Classification Search
CPC ..... H04W 72/53; H04W 68/02; H04W 76/28; H04W 72/23; H04W 52/0216;
(Continued)

(56) References Cited

U.S. PATENT DOCUMENTS

2016/0270028 A1 9/2016 Lee et al.
2018/0302878 A1 10/2018 Byun et al.
(Continued)

FOREIGN PATENT DOCUMENTS

CN 108632949 A 10/2018
CN 108668359 A 10/2018
(Continued)

OTHER PUBLICATIONS

Extended European Search Report for European Patent Application No. 20957095.1 dated Jun. 14, 2023, 12 pages.
(Continued)

*Primary Examiner* — Mazda Sabouri
(74) *Attorney, Agent, or Firm* — Crowell & Moring LLP

(57) ABSTRACT

This disclosure relates generally to adaptive and dynamic paging resource selection and System Information (SI) acquisition in a wireless communication network. Performed by a first network element in a network, the method including: receiving a first message from a second network element of the network; deriving a User Equipment (UE) specific paging resource configuration associated with a UE based on the first message; selecting a paging radio resource based on the UE specific paging resource configuration and based on a radio resource specific paging configuration pre-defined in the first network element; and sending a paging message over the selected paging radio resource to the UE while the UE is in a radio resource control (RRC) inactive state.

20 Claims, 10 Drawing Sheets

(51) Int. Cl.
  *H04W 72/23*    (2023.01)
  *H04W 76/28*    (2018.01)

(58) Field of Classification Search
  CPC ............. H04W 52/0235; H04W 52/02; H04W
        72/044; H04W 72/27; H04W 88/08;
        H04W 88/14; H04W 88/085; Y02D 30/70
  See application file for complete search history.

(56)                References Cited

U.S. PATENT DOCUMENTS

| | | | | |
|---|---|---|---|---|
| 2019/0313369 | A1* | 10/2019 | Abedini | .............. H04W 72/569 |
| 2020/0022109 | A1* | 1/2020 | Wang | .................... H04W 76/27 |
| 2020/0374780 | A1* | 11/2020 | Shan | ................... H04W 72/044 |
| 2022/0078872 | A1* | 3/2022 | Shrestha | .............. H04W 76/30 |
| 2023/0119167 | A1* | 4/2023 | Niu | ....................... H04W 76/28 |
| | | | | 455/458 |

FOREIGN PATENT DOCUMENTS

| | | | |
|---|---|---|---|
| CN | 109451847 | A | 3/2019 |
| CN | 110035498 | A | 7/2019 |
| CN | 110351815 | A | 10/2019 |
| CN | 111148222 | A | 5/2020 |
| EP | 1943854 | B1 | 1/2020 |
| EP | 3 711 400 | A1 | 9/2020 |
| JP | 2019-515604 | A | 6/2019 |
| JP | 2020-511892 | A | 4/2020 |
| JP | 2021-505077 | A | 2/2021 |
| WO | WO 2017/026188 | A1 | 2/2017 |
| WO | WO 2017/171454 | A1 | 10/2017 |
| WO | WO 2018/056347 | A1 | 3/2018 |
| WO | WO 2019/096912 | A1 | 5/2019 |
| WO | WO 2019/106045 | A1 | 6/2019 |
| WO | WO 2019/194486 | A1 | 10/2019 |
| WO | WO 2020/057607 | A1 | 3/2020 |

OTHER PUBLICATIONS

Ericsson, "Paging in disaggregated gNB," 3GPP TSG RAN WG3 Meeting #97b, Tdoc R3-173968, http://www.3gpp.org.ftp/tsg_ran/ WG3_lu/TSGR3_97bis/Docs/, Sep. 29, 2017, 3 pages.

Huawei, "Considerations on the control plane functions located in DU," 3GPP TSG-RAN3 Meeting #95bis, R3-171220, http://www. 3gpp.org/ftp/tsg_ran/WG3_lu/TSGR3_95bis/docs/, Mar. 25, 2017, 3 pages.

Japanese Office Action with English translation, dated Aug. 6, 2024, issued in Japanese Patent Application No. 2022-571793.

European Office Action Communication pursuant to Article 94(3) EPC, Oct. 10, 2024, pp. 1-6. issued in European Application No. 20 957 095.1, European Patent Office, Rijswijk, The Netherlands.

Chinese Office Action with English translation, Patent Search Report with English translation, May 8, 2024, pp. 1-16, issued in Chinese Patent Application No. 202311225149.5.

International Search Report and Written Opinion for International Patent Application No. PCT/CN2020/121065 dated May 19, 2021, 8 pages.

3GPP TS 38.423 v16.3.0 (Sep. 2020), 3$^{rd}$ Generation Partnership Project; Technical Specification Group Radio Access Network; NG-RAN; Xn application protocol (XnAP), Release 16, 451 pages.

3GPP TS 38.473 v16.3.0 (Sep. 2020), 3$^{rd}$ Generation Partnership Project; Technical Specification Group Radio Access Network; NG-RAN; F1 application protocol (F1AP), Release 16, 455 pages.

3GPP TS 36.304 v16.5.0 (Sep. 2021), Technical Specification Group Radio Access Network; Evolved Universal Terrestrial Radio Access (E-UTRA); User Equipment (UE) procedures in idle mode, Release 16, 64 pages.

Chinese-language Office Action issued in Chinese Application No. 202311225149.5 dated Jul. 12, 2024, w/English translation, 8 pages.

Search Report issue in Chinese Application No. 202311225149.5 dated Feb. 27, 2025, w/English translation, 4 pages.

Samsung, "Remaining issues of RRC connection control from Inactive" 3GPP, R2-1711664, Oct. 9, 2017, 7 pages.

Indonesian Office Action issued in Indonesia Application No. P00202213313 dated Jan. 28, 2026 including English translation (7 pages).

Japanese-language Office Action issued in Japanese Application No. 2025-032809 dated Nov. 21, 2025 with English translation (10 pages).

Singapore Office Action issued in Application No. 11202260505W dated Mar. 6, 2026 137 (9 pages).

Korean Office Action issued in Korean Application No. 10-2022-7041075 mailed Apr. 15, 2026, including English translation (18 pages).

* cited by examiner

601: SIB (carrying: radio resource specific paging configuration)

RRC_INACTIVE

602: Paging (carrying: UE specific paging resource configuration)

603: RAN based PAGING sent on the paging radio resource based on the radio resource specific paging configuration and UE specific paging resource configuration

METHOD, DEVICE, AND SYSTEM FOR PAGING RESOURCE SELECTION AND SYSTEM INFORMATION TRANSMISSION/ACQUISITION IN WIRELESS NETWORKS

CROSS-REFERENCE TO RELATED APPLICATION

This application is a continuation application of PCT International Patent Application No. PCT/CN2020/121065, filed with the China National Intellectual Property Administration, PRC on Oct. 15, 2020, which is herein incorporated by reference in its entirety.

TECHNICAL FIELD

This disclosure is directed generally to wireless communications, and particularly to methods, systems and devices for adaptive paging resource allocation and System Information (SI) acquisition.

BACKGROUND

A paging mechanism may be used for informing wireless devices of communication needs. Efficient allocation of paging radio resources is critical for reducing power consumption in these devices during paging processes. The ability for a wireless device to acquire system information update reliably and promptly with minimal power consumption is another important factor to ensure optimal network performance, particularly for low power wireless terminals such as NarrowBand-Internet of Things (NB-IoT), Machine Type Communication (MTC) and enhanced Machine Type Communication (eMTC) devices.

SUMMARY

This disclosure is directed to methods, systems and devices for paging resource selection and SI acquisition in wireless communication networks.

In some implementations, a method for paging using adaptively allocated paging resource, performed by a first network element in a network is disclosed. The method may include receiving a first message from a second network element of the network; deriving a User Equipment (UE) specific paging resource configuration associated with a UE based on the first message; selecting a paging radio resource based on the UE specific paging resource configuration and based on a radio resource specific paging configuration pre-defined in the first network element; and sending a paging message over the selected paging radio resource to the UE.

In some other implementations, a method for transmitting system information, performed by a first network element in a network is disclosed. The method may include sending a first message to a UE in the network during a first pre-determined System Information (SI) acquisition period, the first message comprising an SI update indicator instructing the UE to acquire an SI update from the beginning of a second pre-determined SI acquisition period following the first pre-determined SI acquisition period; and sending the updated SI to the UE in the second pre-determined SI acquisition period.

In some other implementations, a method for acquiring system information, performed by a UE in a network is disclosed. The method comprising: receiving a first message sent from a first network element in the network during a first pre-determined System Information (SI) acquisition period, the first message comprising an SI update indicator instructing the UE to acquire an SI update from the beginning of a second pre-determined SI acquisition period following the first pre-determined SI acquisition period; and receiving the updated SI sent from the first network element in the second pre-determined SI acquisition period.

A network element and/or UE is further disclosed. The network element and/or UE includes a processor and a memory, wherein the processor is configured to read computer code from the memory to implement the method above. A computer-readable medium is further disclosed. The computer-readable medium includes instructions or a computer program which, when executed by a wireless terminal, cause the wireless terminal to carry out the method above.

The above embodiments and other aspects and alternatives of their implementations are described in greater detail in the drawings, the descriptions, and the claims below.

DETAILED DESCRIPTION

The following description and drawing set forth certain illustrative implementations of the disclosure in detail, which are indicative of several example manners in which the various principles of the disclosure may be carried out. The illustrated examples, however, are not exhaustive of the many possible embodiments of the disclosure. Other objects, advantages and novel features of the disclosure will be set forth in the following detailed description when considered in conjunction with the drawings.

Certain features are described using the example of NB-IoT/eMTC wireless communication protocol. However, applicability of the disclosed techniques is not limited to only NB-IoT/eMTC wireless communication protocol, and thus the disclosed implementations are applicable to any wireless standard. Section headings are used in the present disclosure only to improve readability and do not limit scope of the disclosed embodiments and techniques in each section to only that section.

Wireless Communication Network

Figure 1:
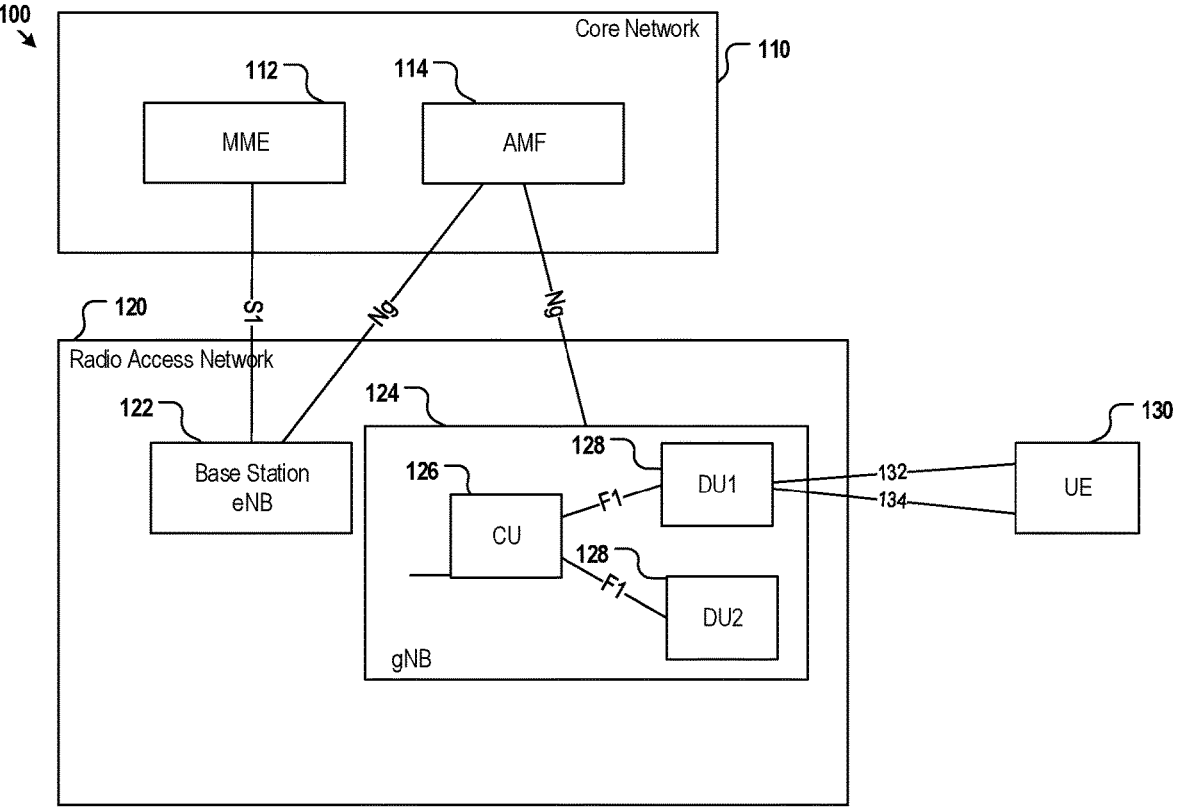
FIG. 1 shows an exemplary wireless communication network.

FIG. 1 shows an exemplary wireless communication network 100 that includes a core network 110 and a radio access network (RAN) 120. The core network 110 further includes at least one Mobility Management Entity (MME) 112 and/or at least one Access and Mobility Management Function (AMF) 114. Other functions that may be included in the core network 110 are not shown in FIG. 1. The RAN 120 further includes multiple base stations, for example, base stations (BS) 122 and 124. The base stations may include at least one evolved NodeB (eNB) 122 for 4G LTE, or a next generation NodeB (gNB) 124 for 5G New Radio (NR), or any other type of signal transmitting/receiving device such as a UMTS NodeB. The example eNB 122 communicates with the MME 112 via an S1 interface. Both the eNB 122 and gNB 124 may connect to the AMF 114 via an Ng interface.

The gNB 124 may further include a central unit (CU) 126 and at least one distributed unit (DU) 128. The CU and the DU may be co-located in a same location, or they may be split in different locations. The CU 126 and the DU 128 may be connected via an F1 interface. Alternatively, for an eNB which is capable of connecting to the 5G network, it may also be similarly divided into a CU and at least one DU, referred to as ng-eNB-CU and ng-eNB-DU, respectively. The ng-eNB-CU and the ng-eNB-DU may be connected via a W1 interface.

The wireless communication network 100 may also include at least one User Equipment (UE) 130. The UE 130 may be implemented as mobile or fixed communication devices which are capable of accessing the wireless communication network 100. The UE 130 may include but is not limited to mobile phones, laptop computers, tablets, personal digital assistants, wearable devices, IoT/NB-IoT devices, MTC/eMTC devices, distributed remote sensor devices, roadside assistant equipment, and desktop computers. The UE 130 may communicate with the base station through Over the Air (OTA) radio communication interface and resources. As shown in FIG. 1, the OTA interface may include multiple ratio carriers 132 and 134. A radio carrier may further be an anchor carrier or a non-anchor carrier.

The wireless communication network 100 may be implemented as, for example, a 2G, 3G, 4G/LTE, or 5G cellular communication network. Correspondingly, the base stations 122 and 124 may be implemented as a 2G base station, a 3G NodeB, an LTE eNB, or a 5G NR gNB (even though, the base station 122 is labeled as an eNB and the base station 124 is labeled as gNB for illustration purposes).

While the description below focuses on cellular wireless communication systems as shown in FIG. 1, the underlying principles are applicable to other types of wireless communication systems supporting wireless devices. These other wireless systems may include but are not limited to Wi-Fi, Bluetooth, ZigBee, and WiMax networks.

Paging Radio Resource Selection

In the wireless communication network 100, a UE may be located and/or waken up by the core network 110 using a paging mechanism which utilizes paging radio resource. The paging radio resources include at least one of paging carrier, paging narrowband, paging physical resource block (PRB), paging bandwidth part (BWP), or paging control-resource set (CORESET). Each of the paging radio resources has its corresponding configuration referred to as radio resource specific paging configuration. The radio resource specific paging configuration includes at least one of carrier specific paging configuration configured per paging carrier, narrow band specific paging configuration configured per paging narrowband, paging physical resource block (PRB) specific paging configuration configured per paging PRB, bandwidth part (BWP) specific paging configuration configured per paging BWP, or control-resource set (CORESET) specific paging configuration configured per paging CORESET. In this disclosure, the term "radio resource specific paging configuration" may be used to refer to any radio resource specific paging configuration in any wireless communication environment including eMTC, NB-IoT, and NR.

In the wireless communication network 100, UEs, especially eMTC, NB-IoT devices are deployed in different areas under different level of cellular coverage. For example, UEs may be deployed in office buildings, warehouses, grocery stores, or underground parking lots. These locations may have different cellular signal quality. Coverage enhancement may be introduced and different coverage condition may correspond to different coverage enhancement level (CEL). Different UEs may be in different coverage enhancement level (CEL), and UEs in different coverage enhancement level may be configured with different maximum numbers of repetitions for NPDCCH common search space (CSS) for paging (e.g., Rmax-paging). CEL and Rmax-paging are considered as part of UE specific paging resource configuration. In some implementations, the UE specific paging resource configuration further includes the Discontinuous Reception (DRX) cycle configured for the UE.

With the introduction of CEL and Rmax-paging, a paging resource, such as a paging carrier and a paging narrowband, may be associated with the UE specific paging resource configuration. For example, carrier 1 may be associated with a lower CEL, and carrier 2 may be associated with a higher CEL. Or carrier 3 may be associated with a lower Rmax-paging and carrier 4 may be associated with a higher Rmax-paging. As such, radio resource may be flexibly and dynamically assigned and scheduled with consideration of the UE specific paging resource configuration of a UE. For example, for a UE under poor coverage which may be indicated by a higher CEL, a radio resource configured with stronger transmission power such as a stronger downlink (DL) transmission power may be selected. In addition, a radio resource configured with larger Rmax-paging may be selected for a UE configured with larger PDCCH repetition number (Rmax-paging).

It is to be understood that, the above scheme for selecting paging radio resource based on the UE specific paging resource configuration needs negotiation and coordination among the UE, the base station, and the core network. The negotiation may be further based on radio resource specific paging configuration. The negotiation enables these network elements to have a consistent view on the radio resource selection. The negotiation may be achieved by various type of signaling or message. For example, when the UE is in a Radio Resource Control idle (RRC_IDLE) state, the UE and/or the BS can select an optimal paging radio resource including a paging carrier or a paging narrowband to reduce or minimize UE power consumption without compromising reliable signal transmission. For example, the UE, the base station, and the core network may negotiate/re-negotiate the CEL, Rmax-paging or DRX cycle based carrier selection capability for the UE, and the core network may send to the base station the negotiated CEL, Rmax-paging or DRX cycle based carrier selection capability in a message, such as an S1AP/NGAP message. In a subsequent procedure, the base station may select the paging radio resource such as paging carrier or paging narrowband based on CEL or Rmax-paing, and the radio resource specific paging configuration. The base station may broadcast the radio resource specific paging configuration to the UE via System Information Block (SIB).

However, for UE in Radio Resource Control inactive (RRC_INACTIVE) state, the base station may not be able to obtain the UE specific paging resource configuration such as CEL, Rmax-paging, and DRX cycle based carrier selection capability. Thus, the base station may not be able to perform the radio resource selection based on the UE specific paging resource configuration.

Furthermore, for CEL or Rmax-paging negotiation using Access Stratus (AS) signaling, the updated CEL or Rmax-paging is transmitted to the core network by UE specific S1AP or NGAP release message. However, when UE is in RRC_INACTIVE state, the UE specific S1AP or NGAP release message is not available, thus CEL or Rmax-paging may not be updated in the core network and/or the base station.

During a paging process, the DRX Cycle(T) is used to determine when the UE needs to wake up to detect a potential paging message. The determination of DRX Cycle (denoted by T) depends on extended Discontinuous Reception (eDRX) cycle for paging, UE specific DRX, and RAN paging cycle. In certain scenarios, the Wake Up Signal (WUS) assistance information (as described in more detail below) is further necessary for Group Wake Up Signal (GWUS) resource selection. If a UE is in the RRC_INACTIVE state and needs to select a target base stations, for example, as a result of cell reselection, the target base station may not know these parameters. For NB-CU and NB-DU split case, NB-DU may also not know these parameters.

The description below discloses in detail implementations and embodiments for selecting paging resources for a UE in RRC_INACTIVE state, based on the UE specific paging resource configuration.

System Information Acquisition

UE power consumption is an important factor to consider when designing the wireless communication system. Referring to FIG. 1, when there is no active communication session between the UE 130 and a base station, then the UE 130 stays in an idle or inactive state, such as RRC_IDLE or RRC_INACTIVE state. The UE 130 continues to monitor paging signals while limiting its usage of the radio resources during the idle state to reduce power consumption. For example, the UE 130 may monitor the paging signal by using techniques including but not limited to DRX or eDRX. In addition, Wake Up Signal (WUS) may be introduced as an enhancement to the existing paging technology to further reduce power consumption and achieve long battery life on the mobile devices by reducing hardware resource usage when monitoring paging information. The wake up mechanism in paging monitoring is especially beneficial to low-power devices such as NB-IoT (Internet-of-Things) and eMTC (enhanced Machine Type Communication) devices.

Figure 2:
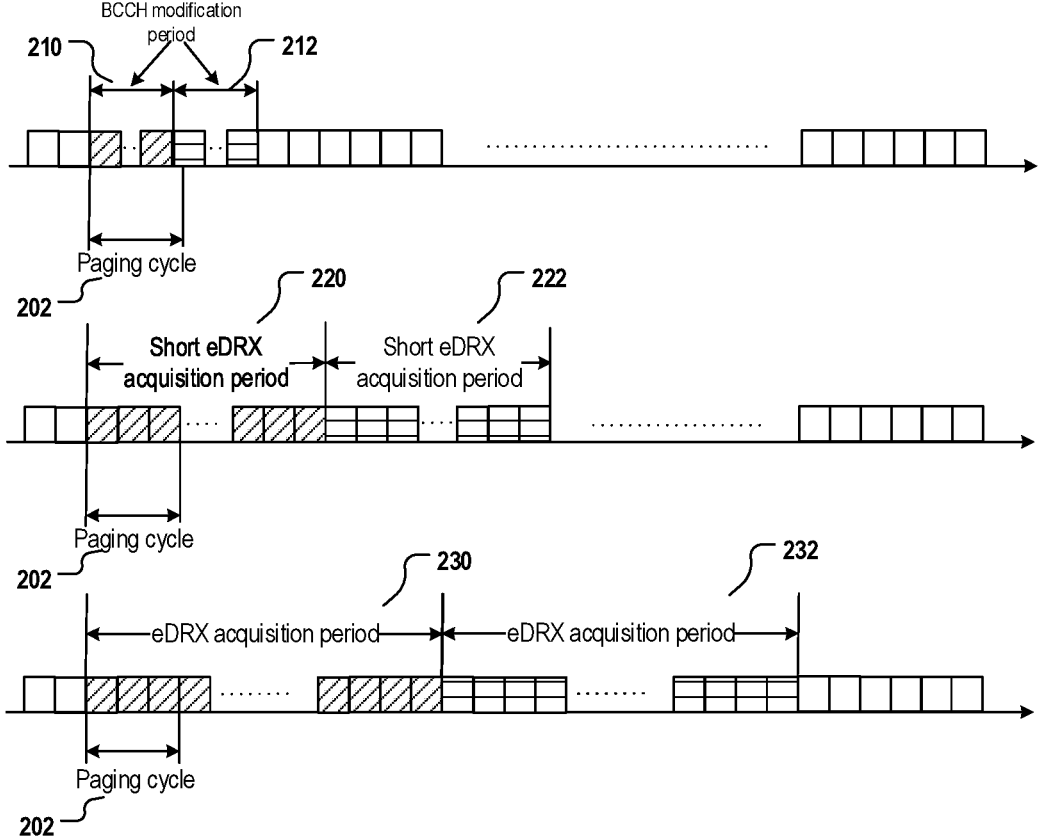
FIG. 2 shows various exemplary periods for system information (SI) acquisition.

In DRX, resource monitoring and communication activities are managed in cycles, referred to as DRX cycles. Particularly, in wireless communication systems such as LTE and 5G, radio signals are transmitted in radio frames. At a system level, the radio frames are identified in sequence and each radio frame is numbered with a System Frame Number (SFN) that recycles from, for example, 0 to 1023. In the DRX mode, a UE may enter into a sleeping mode to reduce battery consumption. The UE periodically monitors a Paging Occasion (PO). A PO includes a set of Physical Downlink Control Channel (PDCCH) monitoring occasions and can include multiple time slots (e.g. subframe or OFDM symbol) where paging DCI can be sent. The purpose of the periodical monitoring on the PO is to check if there is a paging message for the UE as well as to obtain system information update so that the UE may be able to sync up with the network. If there is no paging message for the particular UE, the UE may return to sleep and wake up to monitor the PO in the next cycle. This cycle is referred to as a paging cycle, or a DRX cycle. The length of the paging cycle is given by the number of radio frames in each cycle and may be configurable to different lengths in the wireless communication system. FIG. 2 shows exemplary paging cycles 102.

In eDRX, the UE is able to set and adjust how long it stays in the low power sleep mode before it wakes up to monitor any wireless signal. The eDRX mechanism enables an UE, especially an NB-IoT or an eMTC device to further reduce battery consumption. As another enhancement, the WUS mechanism takes advantage of a low power consumption hardware circuitry which operates on the physical layer which may further help conserve battery life.

In the wireless communication system, system information (SI) may change from time to time and the network needs to notify the UE about the SI change. System information may be transmitted a number of times with the same content within a modification period such as a BCCH (Broadcast Control Channel) modification period or an eDRX acquisition period. The modification period boundaries are defined by SFN values for which SFN mod m=0, where m is the number of radio frames comprising the modification period. For example, m=modificationPeriodCoeff*defaultPagingCycle. Where modificationPeriodCoeff and defaultPagingCycle may be pre-defined by the network and may be further broadcast to the UE via System Information Block (SIB). The modification period boundaries may also be defined similarly by using hyper System Frame Number (H-SFN). The SI update is a two-step process described below:

Step 1: The network (e.g., the base station) first notifies the UEs about the SI change in a first modification period using a paging message or Downlink Control Information (DCI). This period may also be referred to as a change notification period. In some implementations, this SI change notification may be repeated several times in the change notification period. The first modification period may be either a BCCH modification period, or an eDRX acquisition period.

Step 2: In the next modification period, the network transmits the updated SI to the UE. This period may also be referred to as an updated information period.

Referring to FIG. 2, assuming there is an SI change during the first BCCH modification period 210, the base station sends a paging message or DCI to the UE as a notification indicating there is SI change in this period 210. In the next BCCH modification period 212, the base station sends the update SI information to the UE, and this period 212 is considered to be the updated information period.

On the UE side, the UE monitors SI change indication based on BCCH modification period or eDRX acquisition period (e.g., expressed in number of hyper frames=the maximum value of paging eDRX cycle). For example, the base station sends a paging message or DCI which carries the SI change indicator to the UE. For each type of modification period, there may be a corresponding SI change indicator, e.g., a BCCH SI change indicator to indicate that the SI update is in the next BCCH modification period, or an eDRX SI change to indicate that the SI update is in the next eDRX acquisition period. As such, based on the SI change indicator, the UE may choose a corresponding period to acquire the updated SI information. In some implementations, the BCCH SI change indicator and the eDRX SI change indicator may be sent in the paging message or DCI together. In this case, the UE may choose to acquire the updated SI information in the next BCCH modification period and/or the next eDRX acquisition period.

FIG. 2, an SI change during the first eDRX acquisition period 230 is included as an example, so the base station sends a paging message or DCI which carries the eDRX SI change indicator instructing the UE to acquire the updated SI information at the next eDRX acquisition period 232.

When the UE is in RRC_INACTIVE state, the maximum possible DRX cycle may be longer than the BCCH modification period. As shown in FIG. 2, the DRX cycle 202 is longer than the BCCH modification period 210. This may cause a desynchronization, as the BCCH SI change indicators sent in 210 may be missed by the UE, if the UE happens to be in sleeping mode in the DRX cycle when the SI change notification is sent. As further shown in FIG. 2, an eDRX SI change indicator may also be sent via a paging message or DCI in the eDRX acquisition period 230. Since the eDRX acquisition period 230 is longer than the maximum DRX cycle, and since the SI change notification may be sent multiple times in the eDRX acquisition period 230, the UE is able to detect the SI notification, and will be able to acquire the updated SI information in the next eDRX acquisition period 232. However, since the eDRX acquisition period is long, the wait time till the next eDRX acquisition period to acquire the updated SI information may be too long, leading to a long delay of the SI update. As an example, for an eMTC device, the eDRX acquisition period may be as long as 256 hyper frames (about 43 minutes).

In this disclosure, a new SI acquisition period and a corresponding mechanism to adapt the new SI acquisition period into the wireless communication system are implemented. The new SI acquisition period is referred to as a short eDRX acquisition period. The short eDRX acquisition period may be predefined as being longer than the BCCH modification period, but shorter than the eDRX acquisition period. Further details are described in related embodiments below. In such a manner, a balance is achieved so that the UE will not miss an SI update notification, yet is able to catch the SI update more promptly than the implementation using the eDRX acquisition period.

BRIEF DESCRIPTION OF EMBODIMENTS

Various specific example embodiments are described for implementing adaptive and dynamic paging radio resource selection when the UE is in RRC_INACTIVE state. Mechanisms to deliver UE specific paging resource configuration are also disclosed.

Various specific example embodiments are further described for performing System Information (SI) acquisition for a UE in RRC_INACTIVE state.

Embodiment 1

Figure 3:
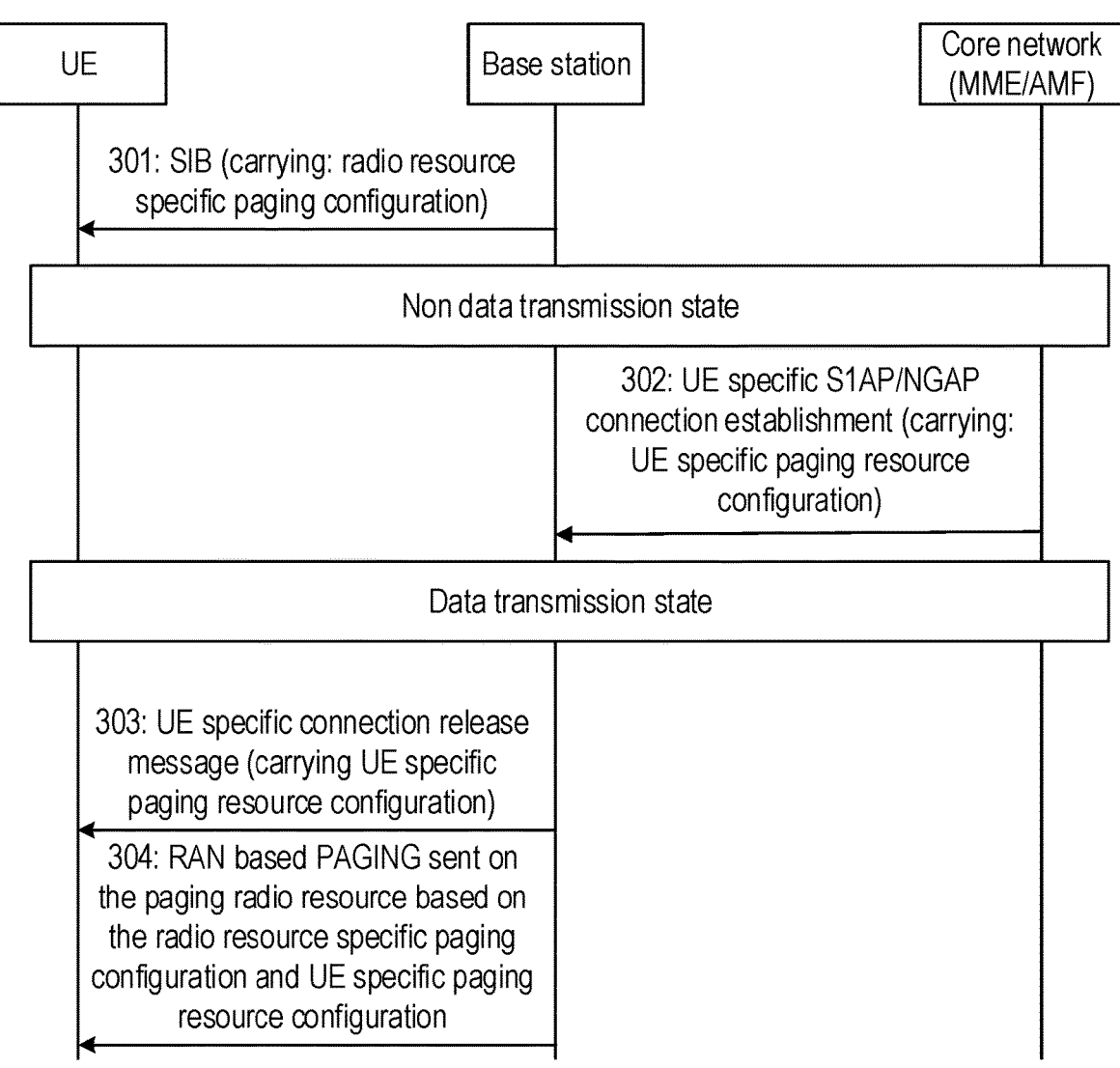
FIG. 3 shows an exemplary message flow for sending a UE specific paging resource configuration using an S1 Application Protocol (S1AP) or NG Application Protocol (NGAP) message.

Refer to FIG. 3 for an exemplary procedure to deliver UE specific paging resource configuration. In this procedure, the core network (MME/AMF) sends the UE specific paging resource configuration to the base station. The base station selects the paging radio resource based on the UE specific paging resource configuration when the UE specific S1AP/NGAP connection is establishing. The details are described below.

Step 301: The base station sends the radio resource specific paging configuration to the UE by System Information Block (SIB). The radio resource specific paging configuration includes at least one of the following:
    CEL;
    Rmax-paging;
    radio resource specific DRX cycle for paging; or
    number of Paging Occasions (POs) per radio resource specific DRX cycle (e.g. nB).
For example, for a particular paging radio resource such as a radio carrier (alternatively referred to as carrier for brevity), the radio resource specific paging configuration of the carrier may contain CEL or Rmax-paging supported by the carrier. The carrier may be an anchor carrier or a non-anchor carrier.

Step 302: The core network sends a message to the base station, when the UE specific S1AP/NGAP connection is establishing. The message carries the UE specific paging resource configuration, for example, by embedding the UE specific paging resource configuration in one or more Information Elements (IEs) of the message. In some implementations, the message may be one of:
    initial context setup request;
    UE context modification request;
    handover request; or
    path switch request acknowledge.
The UE specific paging resource configuration includes at least one of:
    CEL;
    Rmax-paging;
    DRX cycle based paging radio resource selection capability; or
    paging eDRX information.
When receiving the message, the base station stores the UE specific paging resource configuration and the S1AP/NGAP connection is established. A communication session is established for the UE for data transmission.

Step 303: The base station triggers the UE to enter the RRC_INACTIVE state by sending an RRC connection release message to the UE. In some implementations, the base station includes the UE specific paging resource configuration as received in step 302 in the message, to ensure the UE has a synchronized view on UE specific paging resource configuration while in the RRC_INACTIVE state. The UE specific paging resource configuration includes at least one of:
    CEL; or
    Rmax-paging.
In some other implementations, the base station may choose not to include the UE specific paging resource configuration in the RRC connection release message. In this case, the UE uses the previously configured CEL and Rmax-paging while in the RRC_INACTIVE state.

After the UE processes the RRC connection release message, the UE transits into the RCC_INACTIVE state.

Step 304: The base station selects a paging radio resource, such as a particular paging carrier or a particular paging narrowband, and sends a paging message to the UE using the selected paging radio resource. The base station makes the selection based on the radio resource specific paging configuration as sent in SIB in step 301 and based on the UE specific paging resource configuration. In particular, if the UE specific paging resource configuration is included in step 303, then the CEL or Rmax-paging carried in step 303 is used; otherwise the previously configured CEL or Rmax-paging is used.

On the UE side, the UE needs to determine its DRX cycle, which is also referred to as paging DRX Cycle (T). If the UE specific paging resource configuration of step 302 includes the paging eDRX information, but not includes Paging Time Window (PTW), then the DRX Cycle(T) of the UE in the RRC_INACTIVE state is determined by the shortest of the paging eDRX cycle (from the paging eDRX information) and the RAN paging cycle. The RAN paging cycle, for example, may be sent to the UE via SIB in step 301.

Furthermore, if the paging message is initiated from the core network, such as via S1AP PAGING or NGAP PAGING, and the paging message includes the paging eDRX cycle IE, but not includes the PTW, then the DRX Cycle (T) of the UE is determined by the paging eDRX cycle as carried in the paging eDRX Cycle IE.

As described earlier, the paging radio resource includes at least one of:
   paging carrier;
   paging narrowband;
   paging physical resource block (PRB);
   paging bandwidth part (BWP); or
   paging control-resource set (CORESET).
The radio resource-specific paging configuration includes at least one of:
   carrier specific paging configuration configured per paging carrier;
   narrow band specific paging configuration configured per paging narrowband;
   paging physical resource block (PRB) specific paging configuration configured per paging PRB;
   bandwidth part (BWP) specific paging configuration configured per paging BWP; or
   control-resource set (CORESET) specific paging configuration configured per paging CORESET.

Embodiment 2

Figure 4:
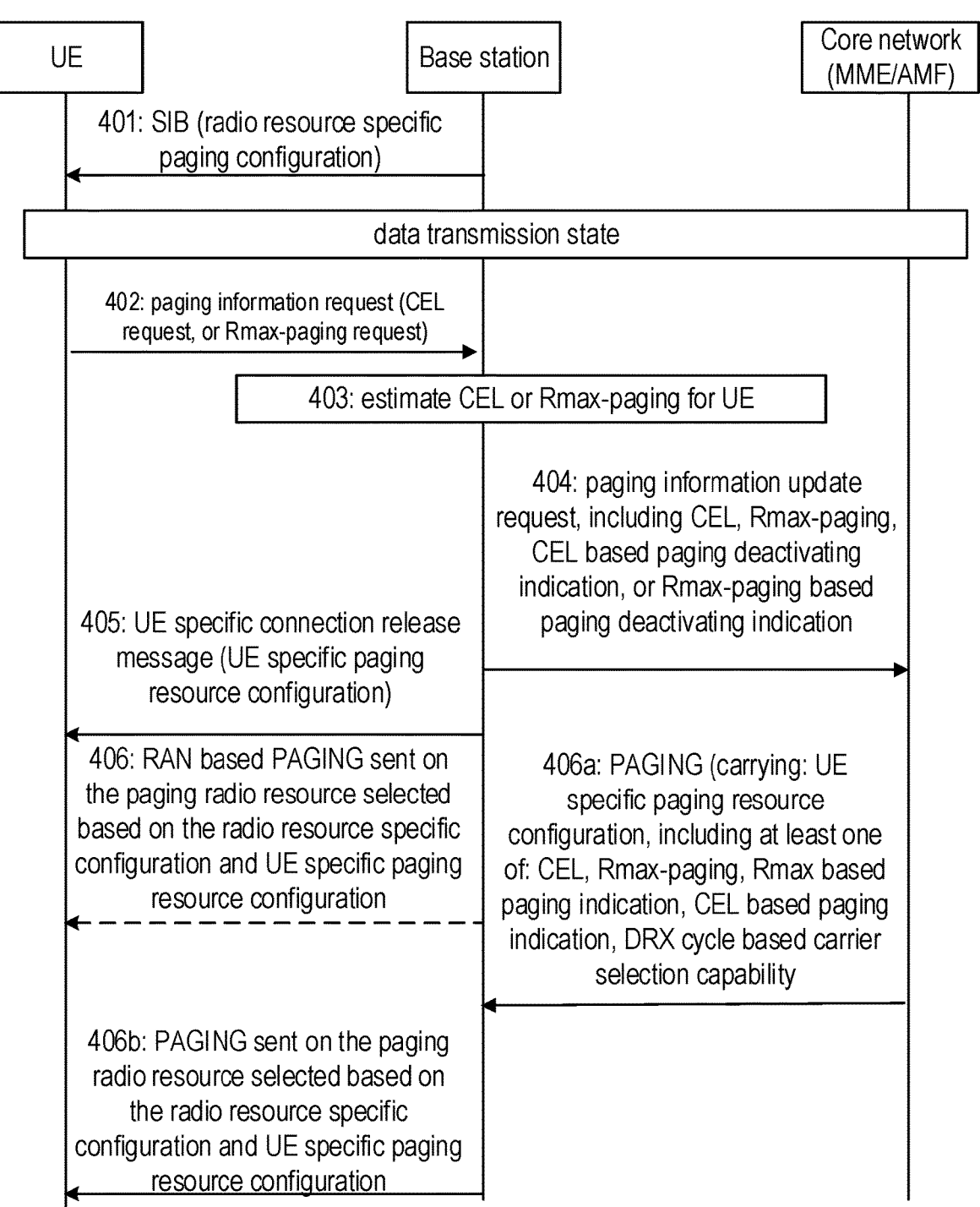
FIG. 4 shows an exemplary message flow for sending UE specific paging resource configuration using a paging information update request and paging message.

Refer to FIG. 4 for another exemplary procedure to update UE specific paging resource configuration. In this procedure, the UE sends a paging information request message to the base station, to request the base station to estimate CEL or Rmax-paging specific for the UE. After the estimation, the base station forwards the updated UE specific paging resource configuration (e.g., CEL or Rmax-paging) to the core network (MME/AMF) via S1AP/NGAP update message. The details are described below.

Step 401: The base station sends the radio resource specific paging configuration to the UE via SIB. The radio resource specific paging configuration includes at least one of the following:
   CEL;
   Rmax-paging;
   radio resource specific DRX cycle for paging; or
   number of Paging Occasions (POs) per radio resource specific DRX cycle (e.g. nB).
For example, for a particular paging radio resource such as a carrier, the radio resource specific paging configuration of the carrier may contain the CEL, or the Rmax-paging supported by the carrier.

Step 402: The UE, while in data transmission state, sends a paging information request to the base station. The paging information request includes at least one of the following information:
   CEL preferred;

CEL based paging resource selection capability;
   Rmax-paging preferred; or
   Rmax-paging based paging resource selection capability.
The paging information request can be sent by at least one of the following message:
   UL MAC CE;
   RRCConnectionReconfigurationComplete;
   RRCConnectionReestablishmentComplete;
   RRCConnectionResumeComplete;
   RRCConnectionSetupComplete;
   RRCEarlyDataRequest;
   UEAssistanceInformation;
   UECapabilityInformation; or
   new UL RRC message (e.g. UEPagingInformationRequest).
The UE sends the paging information request message to the base station, for example, when the radio signal condition of the UE reaches a threshold. The paging information request message triggers the base station to estimate or configure/re-configure the paging resource. The paging resource includes at least one of:
   CEL;
   Rmax-paging;
   CEL based paging deactivating indication; or
   Rmax-paging based paging deactivating indication.

Step 403: Base on the paging information request message from the UE, the base station estimates CEL or Rmax-paging for the UE in data transmission state (e.g. RRC_CONNECTED state, RRC_INACTIVE state, Preconfigured Uplink Resources (PUR) transmission procedure, Early Data Transmission (EDT) procedure, NR small data transmission procedure).

Step 404: The base station sends Paging information Update Request to the core network in a UE specific S1AP or NGAP message to update the UE specific paging configuration. The UE specific S1AP or NGAP message includes at least one of the following message:
   RRC_INACTIVE TRANSITION REPORT; or
   New UE specific S1AP or NGAP message (e.g. paging information configuration update message).
The Paging information Update Request includes at least one of the following information:
   CEL;
   Rmax-paging;
   CEL based paging deactivating indication; or
   Rmax-paging based paging deactivating indication.
The CEL based paging deactivating indication is used to indicate whether the CEL based paging for the UE should be deactivated or not. The Rmax-paging based paging deactivating indication is used to indicate whether the Rmax-paging based paging for the UE should be deactivated or not. In some implementations, if CEL is not included in the Paging information Update Request, it implicitly indicates the CEL based paging should be deactivated for the UE. In some other implementations, if Rmax-paging is not included in the Paging information Update Request, it implicitly indicates the Rmax-paging based paging should be deactivated for the UE.

Step 405: The base station sends an RRC connection release message triggering the UE to enter the RRC_INACTIVE state. The RRC connection release message may include the UE specific paging resource configuration. The UE specific paging resource configuration includes at least one of the following information:
   CEL; or
   Rmax-paging.

Step 406: In some implementations, the base station initiates PAGING sent on the paging radio resource selected based on the radio resource specific paging configuration in accordance with the radio resource specific paging configuration sent via SIB in step 401, and further based on the UE specific paging resource configuration in accordance with the UE specific paging resource configuration sent by the base station in step 405. If UE specific paging resource configuration is included in step 405, then the UE CEL or Rmax-paging included in step 405 is used; otherwise the previously configured CEL or Rmax-paging is used.

In some other implementations, the core network initiates the paging. In this case, step 406 is split into step 406*a* and 406*b*:

Step 406*a*: The core network sends a paging message to the base station. The paging message carries UE specific paging resource configuration which includes at least one of:

CEL;

CEL based paging indication;

Rmax-paging; or

Rmax-paging based paging indication.

Step 406*b*: On the base station side, if the paging message from the core network includes CEL based paging indication, the base station selects paging radio resource based on CEL and the radio resource specific paging configuration. Similarly, if the paging message from the core network includes Rmax-paging based paging indication, the base station selects paging radio resource based on Rmax-paging and the radio resource specific paging configuration. The base station then sends the paging message initiated from the core network to the UE using the selected paging radio resource.

The radio resource-specific paging configuration includes at least one of:

carrier specific paging configuration configured per paging carrier;

narrow band specific paging configuration configured per paging narrowband;

paging physical resource block (PRB) specific paging configuration configured per paging PRB;

bandwidth part (BWP) specific paging configuration configured per paging BWP; or control-resource set (CORESET) specific paging configuration configured per paging CORESET.

Embodiment 3

Figure 5:
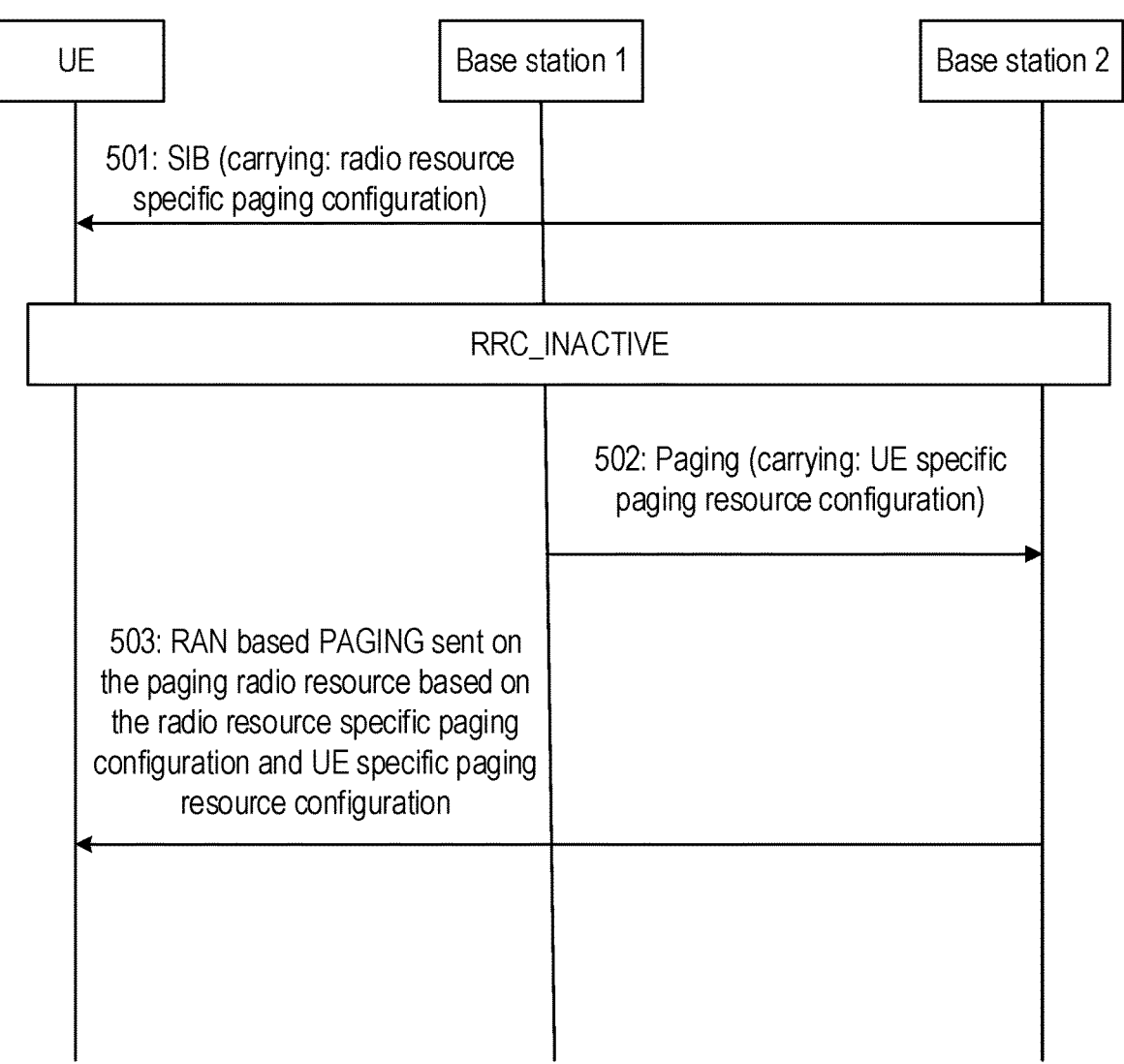
FIG. 5 shows an exemplary message flow for sending a UE specific paging resource configuration using an XnAP message.

Refer to FIG. 5 for an exemplary procedure to deliver UE specific paging resource configuration via a RAN initiated paging. In this procedure, a source base station sends the UE specific paging resource configuration to a target base station via the X2 or Xn interface. The details are described below.

The RAN initiated paging procedure is used by a source base station to request paging of a UE in a target base station. The RAN initiated paging message may carry UE specific paging resource configuration to help the target base station determine the paging radio resource for paging the UE.

Step 501: The target base station (base station 2) sends the radio resource specific paging configuration to the UE by SIB. The radio resource specific paging configuration includes at least one of the following:

CEL;

Rmax-paging;

radio resource specific DRX cycle for paging; or number of Paging Occasions (POs) per radio resource specific DRX cycle (e.g. nB).

In this step, the UE is in the RRC_INACTIVE state.

Step 502: When the UE specific S1AP/NGAP connection is establishing, the source base station (base station 1) receives UE specific paging resource configuration from the core network. The source base sends a RAN initiated paging message to the target base station (base station 2). The RAN initiated paging message contains the UE specific paging resource configuration.

The UE specific paging resource configuration includes at least one of:

CEL;

Rmax-paging;

DRX cycle based paging radio resource selection capability;

WUS Assistance Information;

Paging Probability Information;

Paging eDRX Information;

RAN paging cycle;

UE specific DRX; or

Core Network Assistance Information for the UE in RRC INACTIVE state.

Step 503: The target base station determines the paging radio resource for paging the UE based on the radio resource specific paging configuration and the UE specific paging resource configuration. The UE specific paging resource configuration is received by the target base station in step 502. The paging radio resource includes at least one of:

paging carrier;

paging narrowband;

paging physical resource block (PRB);

paging bandwidth part (BWP);

paging control-resource set (CORESET);

Paging Occasion (e.g., paging frame, paging subframe); or

GWUS resource.

On the UE side, the UE needs to determine the paging DRX Cycle(T). If the UE specific paging resource configuration of step 502 includes the paging eDRX information, but not Paging Time Window (PTW), then the DRX Cycle (T) of the UE in the RRC_INACTIVE state is determined by the shortest of the paging eDRX cycle (from the paging eDRX information) and the RAN paging cycle broadcast to the UE via SIB in step 501.

Furthermore, if the paging message is triggered by the core network, such as S1AP PAGING or NGAP PAGING, and the paging message includes the paging eDRX Cycle IE, but not the PTW, then the DRX Cycle(T) of the UE is determined by the paging eDRX cycle as carried in the paging eDRX Cycle IE.

Embodiment 4

Figure 6:
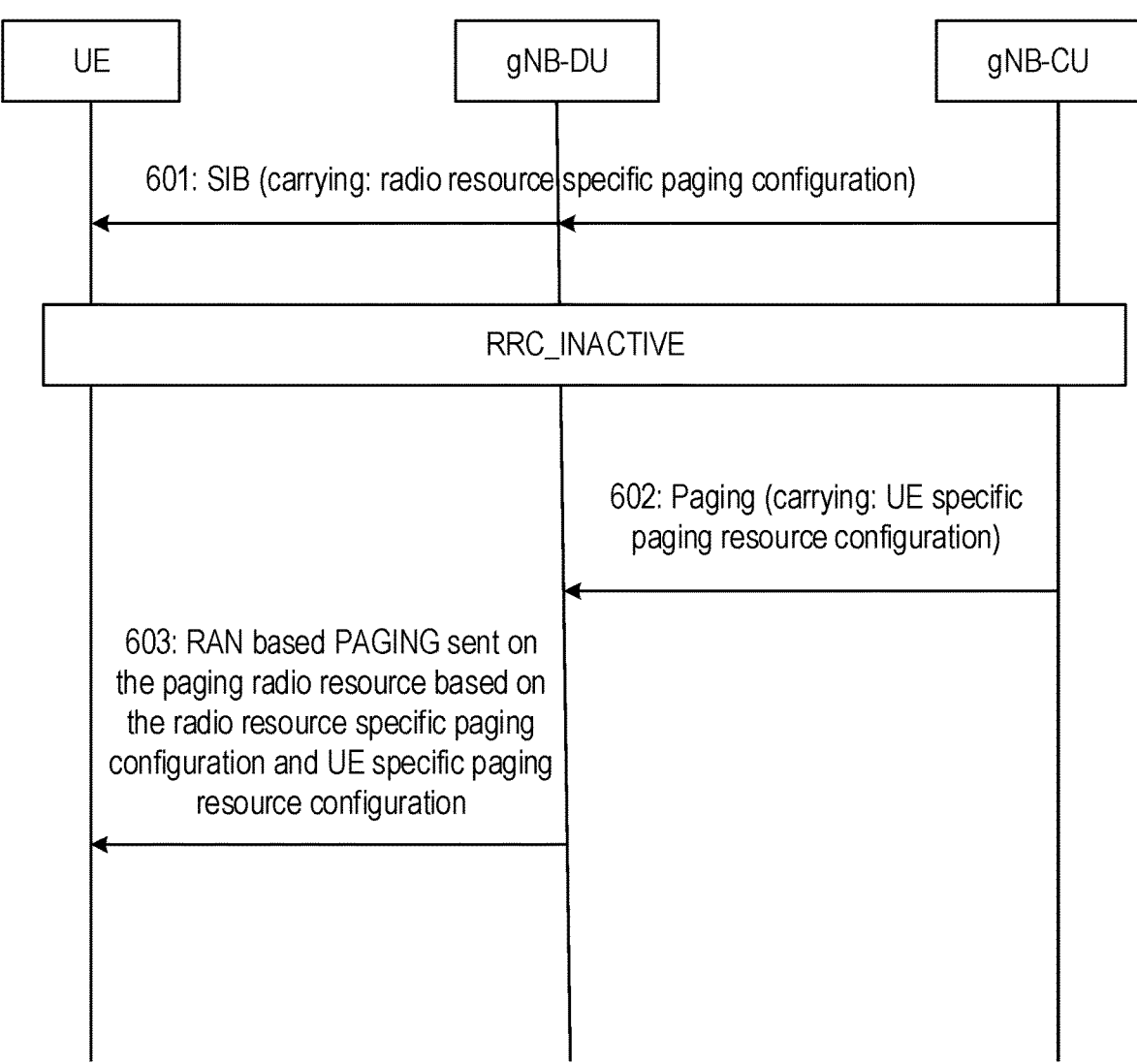
FIG. 6 shows an exemplary message flow for sending a UE specific paging resource configuration using an F1AP message.

Refer to FIG. 6 for an exemplary procedure to deliver UE specific paging resource configuration from a gNB-CU of a gNB to a gNB-DU of the same gNB. In this procedure, the gNB-CU sends the UE specific paging resource configuration to the gNB-DU using F 1 PAGING via an F1 interface. The details are described below.

Step 601: The gNB-CU of a gNB sends the radio resource specific paging configuration to the gNB-DU of the same gNB via SIB, and the gNB-DU forwards the radio resource specific paging configuration to the UE via SIB. The radio resource specific paging configuration includes at least one of the following:

CEL;

Rmax-paging;

radio resource specific DRX cycle for paging; or number of Paging Occasions (POs) per radio resource specific DRX cycle (e.g. nB).

The gNB-CU keeps and maintains the radio resource specific paging configuration, the gNB-CU distributes the radio resource specific paging configuration to the gNB-DU for further broadcast to the UE. In this step, the UE is in the RRC_INACTIVE state.

Step 602: when the gNB-CU receives UE specific paging resource configuration from the core network, the gNB-CU sends the UE specific paging resource configuration to the gNB-DU in a paging message via the F1 interface.

The UE specific paging resource configuration includes at least one of:

CEL;

Rmax-paging;

DRX cycle based paging radio resource selection capability;

WUS Assistance Information;

Paging Probability Information;

Paging eDRX Information;

RAN paging cycle;

UE specific DRX; or

Core Network Assistance Information for the UE in RRC_INACTIVE state.

Step 603: The gNB-DU determines the paging radio resource for paging the UE based on the radio resource specific paging configuration as in step 601 and based on the UE specific paging resource configuration. The gNB-DU sends a RAN based paging message to the UE using the determined paging radio resource. The UE specific paging resource configuration is received by the gNB-DU in step 602. The paging radio resource includes at least one of:

paging carrier;

paging narrowband;

paging physical resource block (PRB);

paging bandwidth part (BWP);

paging control-resource set (CORESET);

Paging Occasion (e.g., paging frame, paging subframe); or

GWUS resource.

On the UE side, the UE needs to determine the paging DRX Cycle(T). If the UE specific paging resource configuration of step 602 includes the paging eDRX information, but not the PTW, then the DRX Cycle(T) of the UE in the RRC_INACTIVE state is determined by the shortest of the paging eDRX cycle (from the paging eDRX information) and the RAN paging cycle.

Furthermore, if the paging message in step 602 includes the paging eDRX Cycle IE, but not the PTW, then the DRX Cycle(T) of the UE in RRC_IDLE state is determined by the paging eDRX cycle as carried in the paging eDRX Cycle IE.

Embodiment 5

In the previous embodiments, paging resource selection based on UE specific paging resource configuration is only performed when the UE is in the last used cell of the UE. The last used cell is the cell in which the UE's RRC connection was last released normally (e.g. UE and eNB/CN node (MME/AMF) can keep consistent information about the last used cell based on this release procedure). For example, the cell in which the UE most recently entered RRC_IDLE or RRC_INACTIVE state triggered by any of the following conditions:

reception of an RRCEarlyDataComplete message; or reception of an RRCConnectionRelease not including noLastCellUpdate;

paging resource selection based on UE specific paging resource configuration is not performed when UE is not in the last used cell. In which case, paging will be sent on the paging resource without the consideration of the UE specific paging resource configuration.

Figure 9:
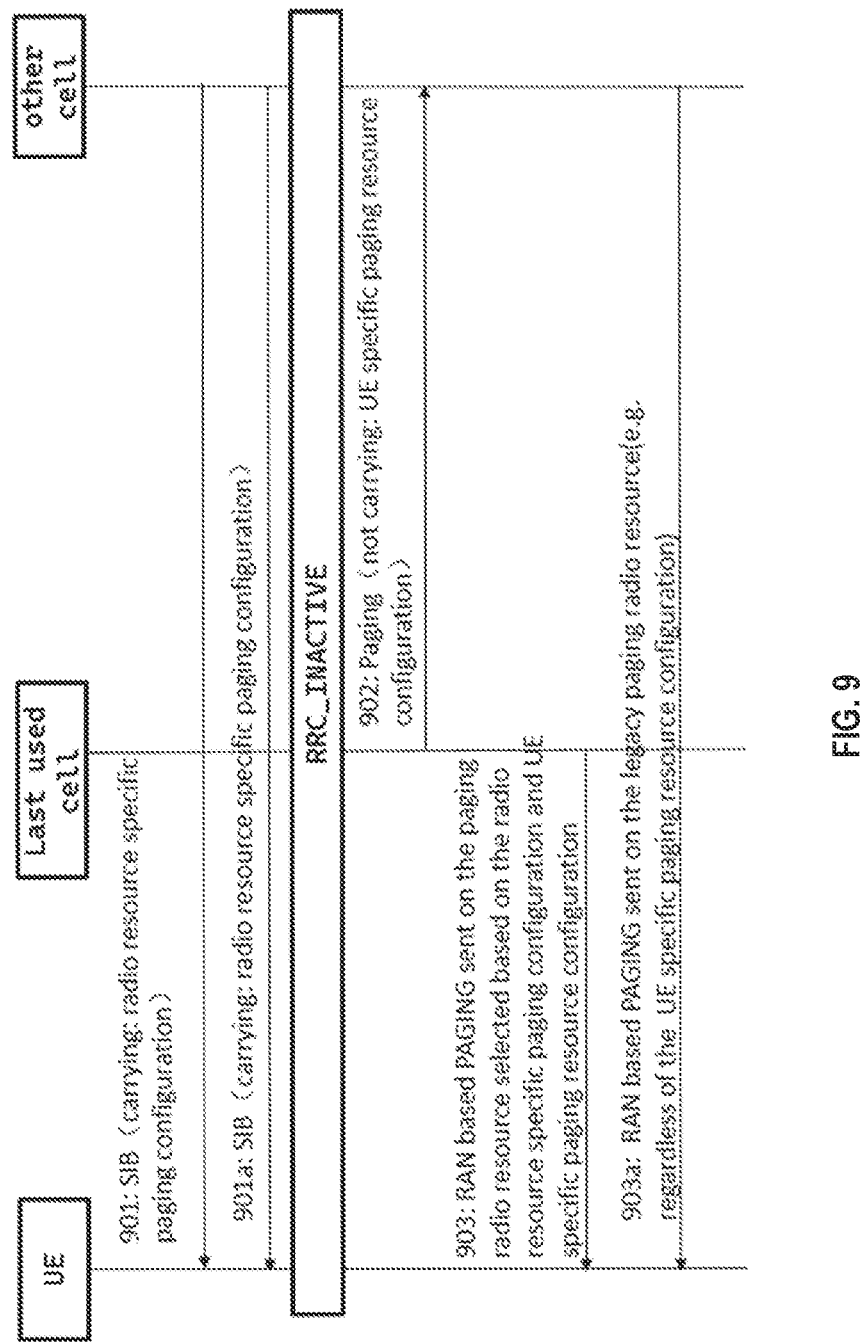
FIG. 9 shows an exemplary message flow showing a UE specific paging resource configuration is only used in the last used cell for RAN paging.

Refer to FIG. 9 for an example.

Step 901: The last used cell sends its radio resource specific paging configuration to the UE by System Information Block (SIB).

Step 901a: Another cell other than the last used cell sends its radio resource specific paging configuration to the UE by System Information Block (SIB).

Step 902: The last used cell sends a paging message to the other cell, the paging message does not carry the UE specific paging resource configuration.

Step 903: The last used cell determines the paging radio resource for paging the UE based on the radio resource specific paging configuration and the UE specific paging resource configuration, and sends a RAN based paging message to UE using the determined paging radio resource.

Step 903a: the other cell sends the RAN based paging message to the UE using the paging radio resource without the consideration of the UE specific paging resource configuration.

Figure 10:
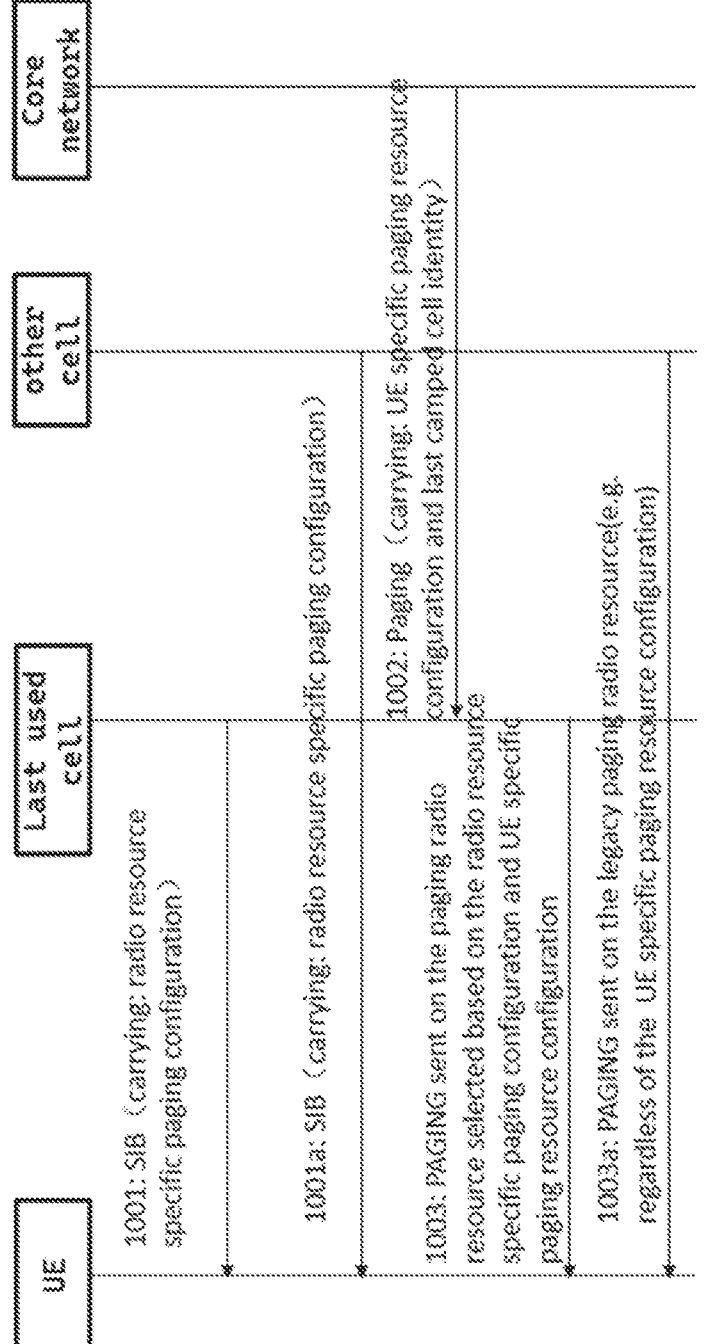
FIG. 10 shows an exemplary message flow showing a UE specific paging resource configuration is only used in the last used cell for core network paging.

Refer to FIG. 10 for another example.

Step 1001 and 1001a are similar to step 901 and 901a as shown in FIG. 9, respectively, detailed description is skipped here.

Step 1002: The core network sends a paging message to the last used cell of the UE, carrying the UE specific paging resource configuration.

Step 1003 and 1003a are similar to step 903 and 903a as shown in FIG. 9. Again, the other cell sends the core network initiated paging message to the UE using the paging radio resource without the consideration of the UE specific paging resource configuration.

Embodiment 6

Figure 7:
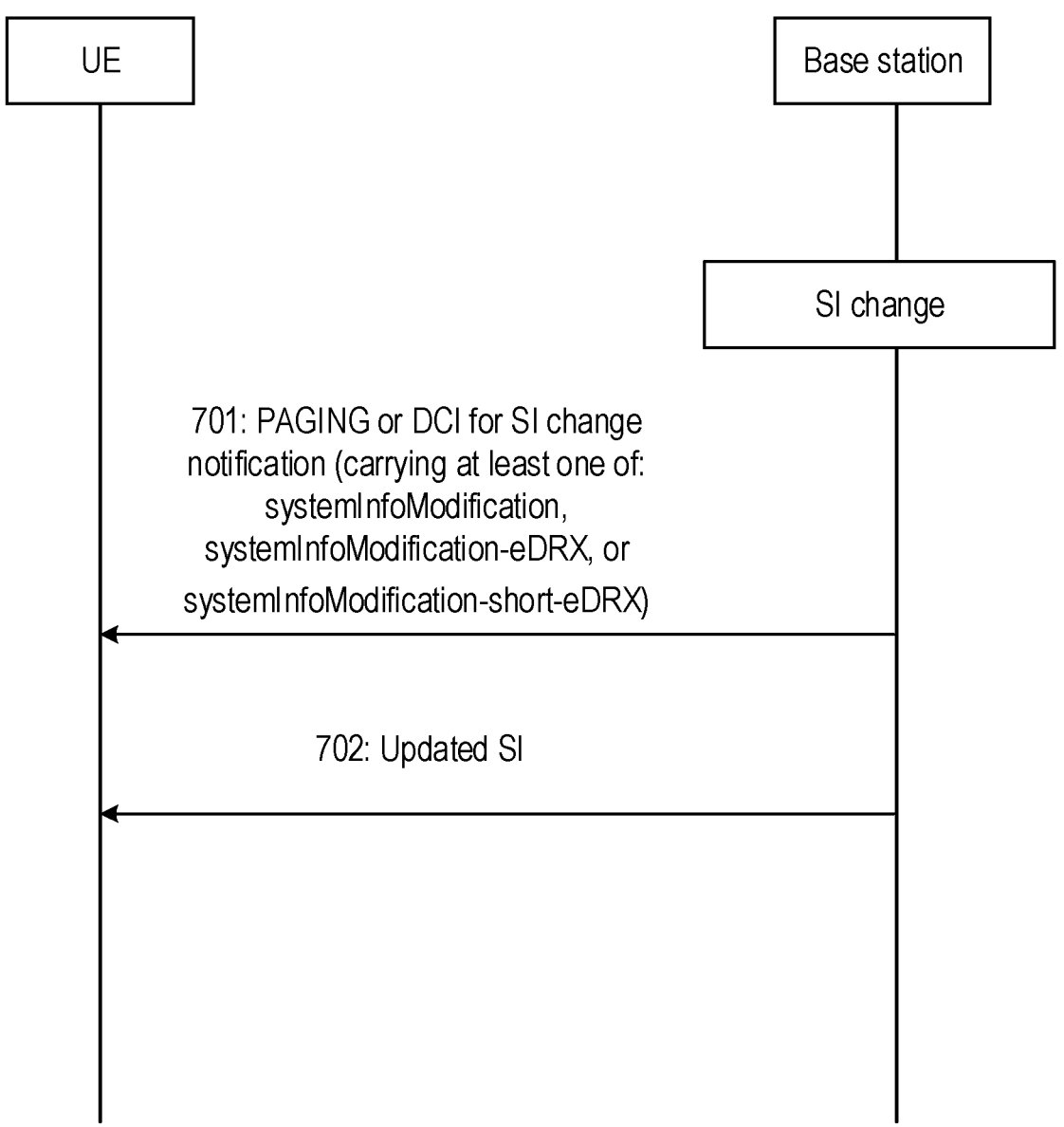
FIG. 7 shows an exemplary message flow for sending a system information update.

Refer to FIG. 7 for an exemplary procedure for the base station to instruct the UE in the RRC_INACTIVE state to acquire the SI update at the next short eDRX acquisition period.

Step 701: Upon SI changes, the base station sends a paging message to the UE in the first short eDRX acquisition period. The paging message carries an indicator systemInfoModification-short-eDRX to instruct the UE an SI update is coming in the next short eDRX acquisition period, so the UE may acquire the SI update. In some implementations, the paging message may also carry a systemInfoModification indicator to instruct the UE an SI update is coming in the next BCCH modification period, and/or a systemInfoModification-eDRX indicator to instruct the UE an SI update is coming in the next eDRX acquisition period. In some implementations, each of these indicators may be carried in a bit.

Alternatively, the base station may use a DCI instead of a paging message to serve the same purpose in step 701.

Step 702: The base station sends the updated SI in the next short eDRX acquisition period.

The short eDRX acquisition period is pre-defined to be longer than the BCCH modification period (corresponding to the systemInfoModification indicator), and less than the eDRX acquisition period (corresponding to the systemInfoModification-eDRX indicator). Furthermore, the length of the short eDRX acquisition period equals to the maximum value in the RAN paging cycle value range, or equals to the maximum value in the DRX cycle(T) value range when the UE in RRC_INACTIVE state. The length of the BCCH modification period and the length of the eDRX acquisition period are pre-defined in the wireless communication network. Similarly, the RAN paging cycle value range and the DRX Cycle(T) value range are also pre-defined in the wireless communication network.

Embodiment 7

Figure 8:
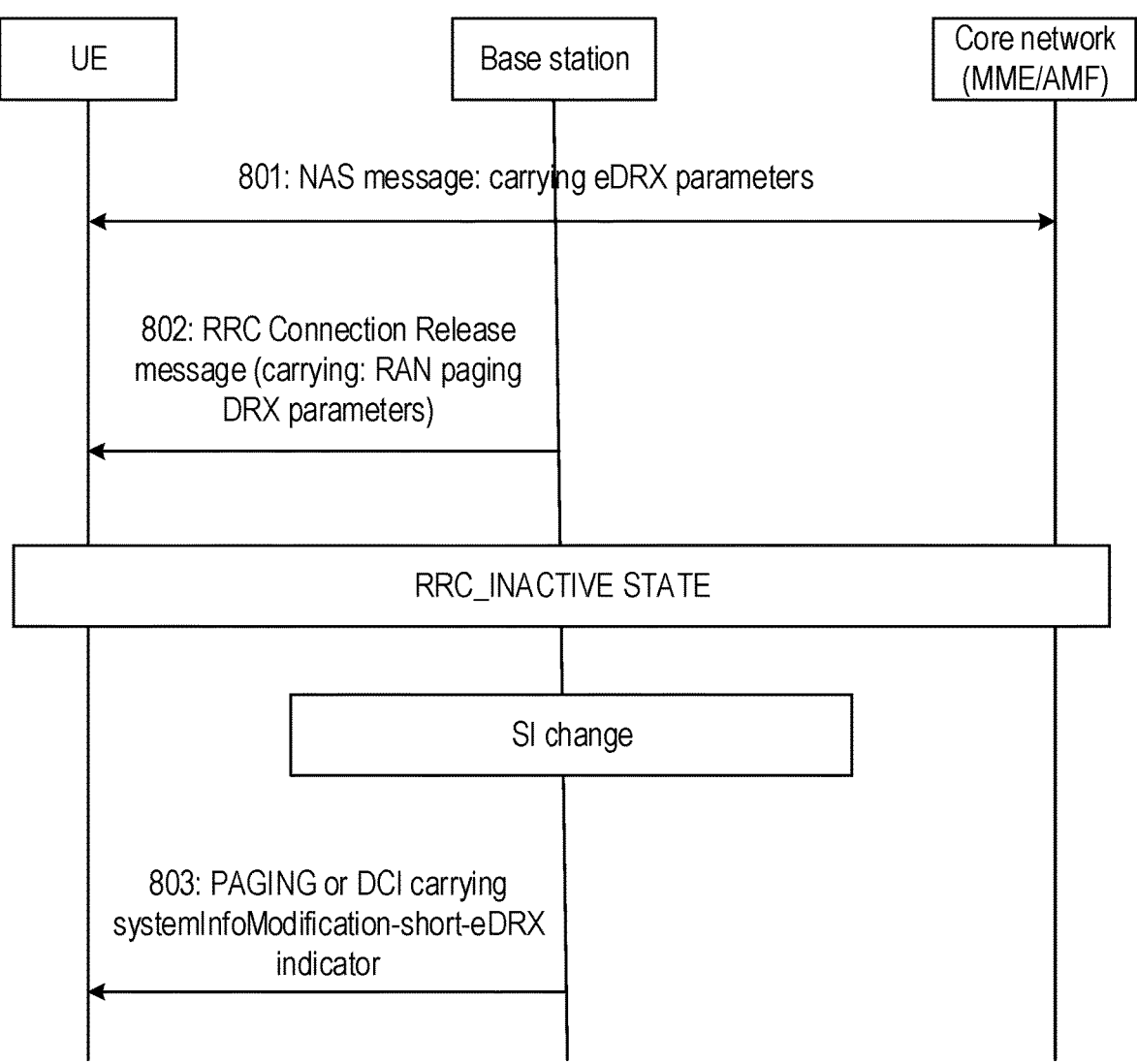
FIG. 8 shows another exemplary message flow for sending a system information update.

Refer to FIG. 8 for another exemplary procedure for the base station to instruct the UE in the RRC_INACTIVE state to acquire the SI update in a short eDRX acquisition period.

Step 801: The UE and the core network negotiates the eDRX parameters through NAS message. In some implementations, the base station also involves in the negotiation.

Step 802: The base station sends an RRC Connection Release message carrying the RAN paging DRX parameters to the UE and triggers the UE to enter the RRC_INACTIVE state.

After the UE enters the RRC_INACTIVE state, the UE monitors the paging message or DCI carrying systemInfo-Modification-short-eDRX indicator in at least one of the following cases:

Case 1: RAN paging cycle (ran-pagingCycle) is longer than the BCCH modification period. The RAN paging cycle may be obtained by the UE via SIB.

Case 2: Idle mode paging eDRX Cycle is longer than the BCCH modification period. The idle mode paging eDRX Cycle may be obtained from the eDRX parameters in step 801.

Case 3: Idle mode paging eDRX information is configured in the UE and ran-pagingCycle is longer than the BCCH modification period. The idle mode paging eDRX information may be obtained from the eDRX parameters in step 801.

Step 803: Upon SI changes, the base station sends a paging message to the UE in the first short eDRX acquisition period. The paging message carries an indicator systemIn-foModification-short-eDRX to instruct the UE that an SI update is coming. Alternatively, the base station may send a DCI instead of a paging message to serve the same purpose.

Subsequently, the UE catches the systemInfoModifica-tion-short-eDRX indicator, and acquires the updated SI information in the next short eDRX acquisition period.

Embodiment 8

Refer to FIG. 2 for the UE in the RRC_INACTIVE state to acquire the SI update in a short eDRX acquisition period.

In short eDRX acquisition period 220, the UE receives the paging message or DCI carrying the systemInfoModifica-tion-short-eDRX indicator.

In the next short eDRX acquisition period 222, the UE acquires the updated system information immediately from the start of the short eDRX acquisition period 222. In some implementations, the next short eDRX acquisition period may be immediately next to the short eDRX acquisition period 220.

Below is an example for an eMTC device:

The BCCH modification period may be expressed in number of radio frames=modificationPeriodCoeff*defaultPagingCycle.

The eDRX acquisition period may be expressed in number of hyper frames. For example, the boundaries of the eDRX acquisition period may be determined by H-SFN values for which H-SFN mod 256=0. For the eMTC device, the length of the eDRX acquisition period may be set to 256 hyper frames, which is the maximum value in the paging eDRX cycle value range.

Short eDRX acquisition period may be expressed in number of radio frames or hyper frame. For example, the boundaries of the short eDRX acquisition period may be determined by radio frame values for which SFN mod 1024=0. In one implementation, the length of the short eDRX acquisition period may be set to 1024 radio frames or 1 hyper frame, which is the maximum value in the RAN paging cycle value range.

To summarize, the disclosure above describes a method and system for adaptively allocating paging resource based on the UE specific paging resource configuration. For UE with a particular UE specific paging resource configuration, such as CEL, Rmax-paging, or DRX cycle based paging radio resource selection capability, the base station may choose a paging radio resource according to the UE specific paging resource configuration, with further reference to radio resource specific paging configuration. The paging radio resource may include paging carrier, paging narrow-band, or the like.

This disclosure also describes a new acquisition period for system information acquisition, namely the short eDRX acquisition period. The length of the short eDRX acquisition period is set to be longer than the BCCH modification period and shorter than the eDRX acquisition period. A new indi-cator corresponding to the new acquisition period is also introduced, which may be carried in a paging message or DCI, to instruct the UE to acquire the updated SI informa-tion at the next short eDRX acquisition period.

The description and accompanying drawings above pro-vide specific example embodiments and implementations. The described subject matter may, however, be embodied in a variety of different forms and, therefore, covered or claimed subject matter is intended to be construed as not being limited to any example embodiments set forth herein. A reasonably broad scope for claimed or covered subject matter is intended. Among other things, for example, subject matter may be embodied as methods, devices, components, systems, or non-transitory computer-readable media for storing computer codes. Accordingly, embodiments may, for example, take the form of hardware, software, firmware, storage media or any combination thereof. For example, the method embodiments described above may be implemented by components, devices, or systems including memory and processors by executing computer codes stored in the memory.

Throughout the specification and claims, terms may have nuanced meanings suggested or implied in context beyond an explicitly stated meaning. Likewise, the phrase "in one embodiment/implementation" as used herein does not nec-essarily refer to the same embodiment and the phrase "in another embodiment/implementation" as used herein does not necessarily refer to a different embodiment. It is intended, for example, that claimed subject matter includes combinations of example embodiments in whole or in part.

In general, terminology may be understood at least in part from usage in context. For example, terms, such as "and", "or", or "and/or," as used herein may include a variety of meanings that may depend at least in part on the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," may be understood to convey a singular usage or to convey a plural usage, depending at least in part upon context. In addition, the term "based on" may be understood as not necessarily intended to convey an exclusive set of factors and may, instead, allow for the existence of additional factors not necessarily expressly described, again, depending at least in part on context.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution may be practiced without one or more of the specific features or advantages of a particular embodiment. In other instances, additional features and advantages may be recognized in certain embodiments that may not be present in all embodiments of the present solution.

What is claimed is:

1. A method for wireless communications, performed by a first network element in a network, the method comprising:
receiving a first message from a second network element of the network, the first message comprising a User Equipment (UE) specific paging resource configuration associated with a UE, the UE specific paging resource configuration comprising a paging extended Discontinuous Reception (eDRX) Information, and a Radio Access Network (RAN) paging cycle;
deriving the UE specific paging resource configuration from the first message;
in response to the UE being in a Radio Resource Control (RRC) inactive state, selecting a paging radio resource based on the UE specific paging resource configuration and based on a radio resource specific paging configuration pre-defined in the first network element; and
sending a paging message over the selected paging radio resource to the UE.

2. The method of claim 1, wherein the UE specific paging resource configuration further comprises at least one of following parameters associated with the UE:
UE specific Discontinuous Reception (DRX); or
Core Network Assistance Information for the UE in a Radio Resource Control (RRC) inactive state.

3. The method of claim 1, wherein the paging radio resource comprises a paging occasion (PO).

4. The method of claim 1, wherein the paging message comprises at least one of:
a XnAP paging message; or
an F1AP paging message.

5. The method of claim 1, wherein the first message comprises the UE specific paging resource configuration associated with the UE.

6. The method of claim 5, wherein the first message comprises a paging message.

7. The method of claim 1, wherein the first network element comprises a first base station, the second network element comprises a second base station.

8. The method of claim 1, wherein the first network element comprises a gNB-DU, and the second network element comprises a gNB-CU.

9. A first network element in a network, the first network element comprising a memory for storing computer instructions and a processor in communication with the memory, wherein, when the processor executes the computer instructions, the processor is configured to cause the first network element to:
receive a first message from a second network element of the network, the first message comprising a User Equipment (UE) specific paging resource configuration associated with a UE, the UE specific paging resource configuration comprising a paging extended Discontinuous Reception (eDRX) Information, and a Radio Access Network (RAN) paging cycle;
derive the UE specific paging resource configuration from the first message;
in response to the UE being in a Radio Resource Control (RRC) inactive state, select a paging radio resource based on the UE specific paging resource configuration and based on a radio resource specific paging configuration pre-defined in the first network element; and
send a paging message over the selected paging radio resource to the UE.

10. The first network element of claim 9, wherein the UE specific paging resource configuration further comprises at least one of following parameters associated with the UE:
UE specific Discontinuous Reception (DRX); or
Core Network Assistance Information for the UE in an RRC inactive state.

11. The first network element of claim 9, wherein the paging radio resource comprises a paging occasion (PO).

12. The first network element of claim 9, wherein the paging message comprises at least one of:
a XnAP paging message; or
an F1AP paging message.

13. The first network element of claim 9, wherein the first message comprises the UE specific paging resource configuration associated with the UE.

14. The first network element of claim 13, wherein the first message comprises a paging message.

15. The first network element of claim 9, wherein the first network element comprises a first base station, the second network element comprises a second base station.

16. The first network element of claim 9, wherein the first network element comprises a gNB-DU, and the second network element comprises a gNB-CU.

17. A non-transitory storage medium for storing computer readable instructions, the computer readable instructions, when executed by a processor in a first network element in a network, causing the processor to:
receive a first message from a second network element of the network, the first message comprising a User Equipment (UE) specific paging resource configuration associated with a UE, the UE specific paging resource configuration comprising a paging extended Discontinuous Reception (eDRX) Information, and a Radio Access Network (RAN) paging cycle;

derive the UE specific paging resource configuration associated with a UE from the first message;

in response to the UE being in a Radio Resource Control (RRC) inactive state, select a paging radio resource based on the UE specific paging resource configuration and based on a radio resource specific paging configuration pre-defined in the first network element; and send a paging message over the selected paging radio resource to the UE.

18. The non-transitory storage medium of claim 17, wherein:

the UE specific paging resource configuration further comprises at least one of following parameters associated with the UE:

UE specific Discontinuous Reception (DRX); or

Core Network Assistance Information for the UE in an RRC inactive state; and the paging radio resource comprises a paging occasion (PO).

19. The first network element of claim 17, wherein:

the paging message comprises at least one of:

a XnAP paging message; or an F1AP paging message; and the first message comprises the UE specific paging resource configuration associated with the UE.

20. The first network element of claim 17, wherein:

the first message comprises a paging message; and a combination of the first network element and the second network element comprises one of:

the first network element being a first base station, the second network element being a second base station; or the first network element being a gNB-DU, and the second network element being a gNB-CU.

* * * * *